N. J. SIMONDS,

Assignor to E. D. RICHARDSON.

Shoe-Stiffener.

No. 8,849. Reissued Aug. 12, 1879.

Witnesses:

Samuel D. Kelly

Eugene Humphrey

Inventor:

Nathan J. Simonds

By Porter & Hutchinson

Attys

N. PETERS, PHOTO-LITHOGRAPHER, WASHINGTON, D. C.

UNITED STATES PATENT OFFICE.

NATHAN J. SIMONDS, OF WOBURN, MASSACHUSETTS, ASSIGNOR TO ELLEN D. RICHARDSON.

IMPROVEMENT IN SHOE-STIFFENINGS.

Specification forming part of Letters Patent No. 115,648, dated June 6, 1871; Reissue No. 8,849, dated August 12, 1879; application filed July 16, 1877.

*To all whom it may concern:*

Be it known that I, NATHAN J. SIMONDS, of Woburn, in the county of Middlesex and State of Massachusetts, have invented new and useful Improvements in Shoe-Stiffenings, of which the following is a specification.

This invention relates to stiffenings of leather; and the invention consists in a stiffening of such material, molded either with a base or bend line, or else molded to the exact form it is to occupy when incorporated in the boot and shoe, as is hereinafter more fully described.

Figure 1:
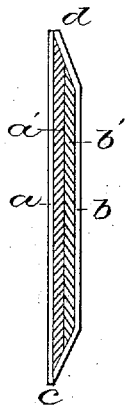
Figure 2:
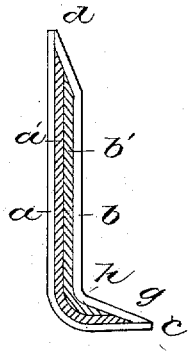
Figure 3:
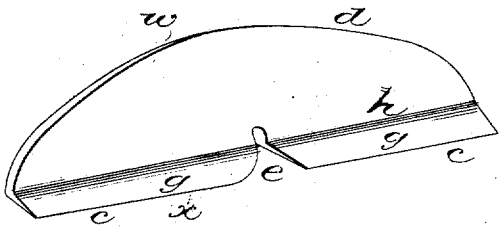
Figure 4:
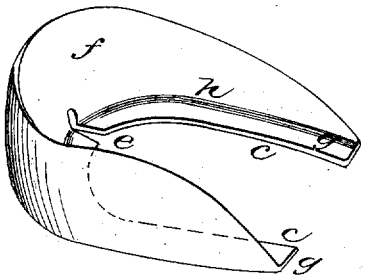
Figure 5:
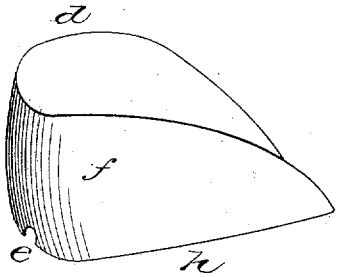

In the accompanying drawings, Figure 1 is a transverse section taken through line *w x*, Fig. 3. Fig. 2 is a similar section, and shows the bend-line molded. Fig. 3 is a perspective view of the stiffening with the bend-line molded. Fig. 4 is a front and side perspective view of a fully-molded stiffening. Fig. 5 is a back and side view of the same.

Similar letters of reference indicate corresponding parts in the several figures.

In the drawings, *a* represents the back of the stiffening. *b* is the face; and *a'* and *b'* are two diminished layers or thicknesses interposed between back *a* and face *b*, as shown, the whole being rolled to a beveled edge, as shown in Figs. 1 and 2.

When the stiffening is prepared for molding, in whatever manner, the space shown at *e* on line *c*, Figs. 3 and 4, is cut away, and in some kinds of stiffenings it is advisable to cut several of these notches to facilitate molding.

When it is desired only to mold a bend-line, as shown at *h*, Fig. 3, the stiffening is placed in a properly-constructed die, operated by machinery, by which the part marked *g* is bent at right angles to that marked *f*, so that line *c* is in one plane and line *d* in another, the two being at about ninety degrees from each other; but when it is intended to mold the stiffening into the form it will occupy in the shoe, it is molded in dies operated by machinery to the form shown in Figs. 4 and 5, in which case the part *g* is at an angle of about ninety degrees with part *f*; but this latter is molded to a curve corresponding to the counter of the shoe, so that angle *g* is in the exact form to be attached to the heel of the inner sole, while angle *f* is in proper form to be interposed between the layers or parts of the boot or shoe counter.

When the stiffening is molded as shown in Fig. 3, it is readily curved to any desired form of counter, and for certain classes of work possesses peculiar advantages; but for general purposes a fully-molded stiffening is preferred.

As the invention herein described does not consist in the processes or mechanism employed, but only in the article produced, a description of the mechanical means employed is not deemed necessary, especially as the same are shown in the Patent Office.

Having thus described my invention, what I claim as new, and desire to secure by Letters Patent, is—

A heel-stiffener composed of a series of layers of leather, as shown and described, reduced at its edge and molded into form, as set forth.

NATHAN J. SIMONDS.

Witnesses:

EUGENE HUMPHREY,

EBEN HUTCHINSON.